April 24, 1951 G. E. BURKS ET AL 2,549,889
LUBRICATING SYSTEM
Filed Aug. 16, 1946 5 Sheets-Sheet 1

INVENTORS.
GEORGE E. BURKS
GEORGE T. LUNDBERG
BY HOWARD D. NICHOLS
Charles M. Fryer
ATTORNEY.

April 24, 1951

G. E. BURKS ET AL 2,549,889

LUBRICATING SYSTEM

Filed Aug. 16, 1946

INVENTORS.
GEORGE E. BURKS
GEORGE T. LUNDBERG
BY HOWARD D. NICHOLS

Charles M. Fryer
ATTORNEY.

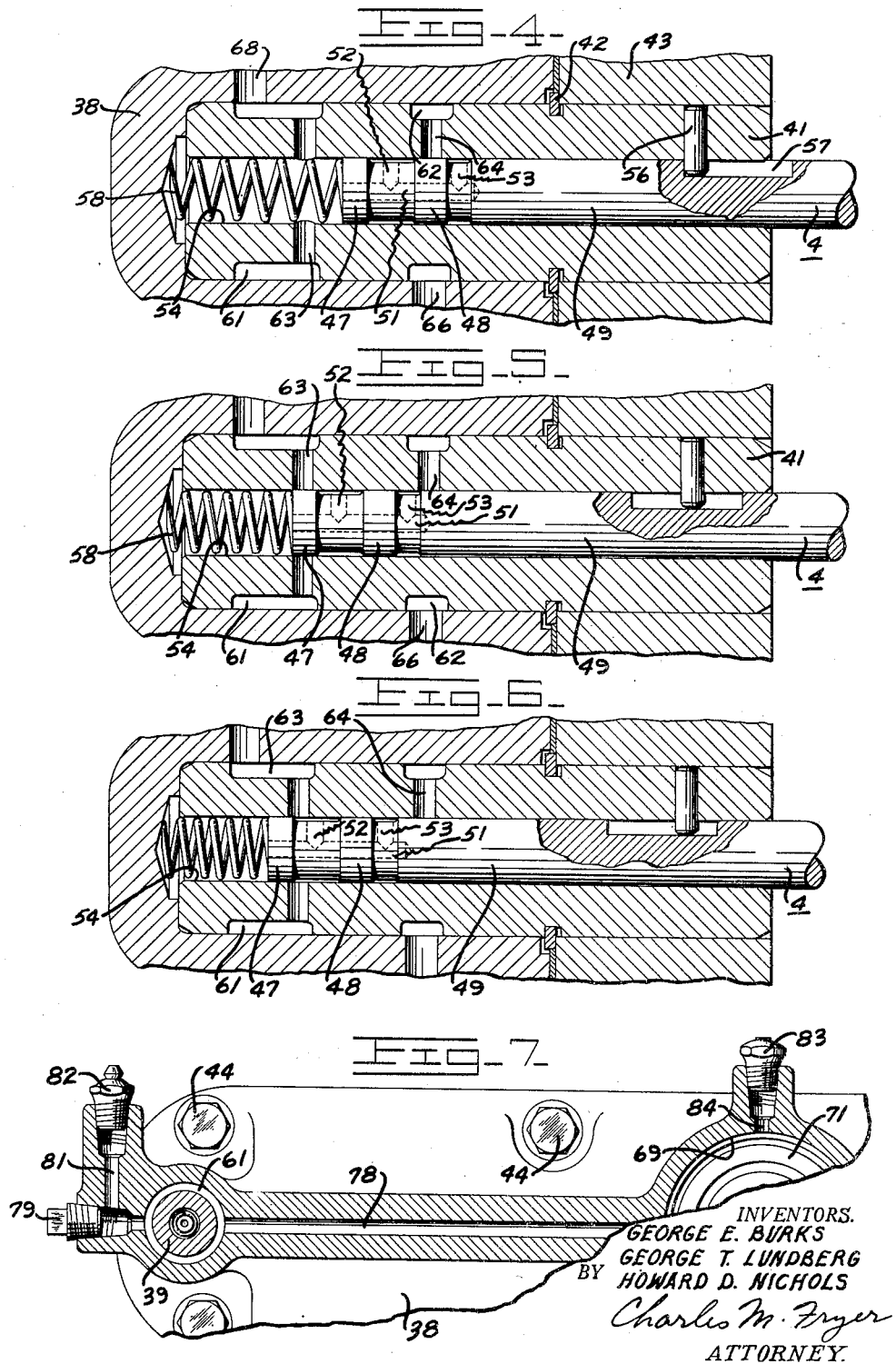

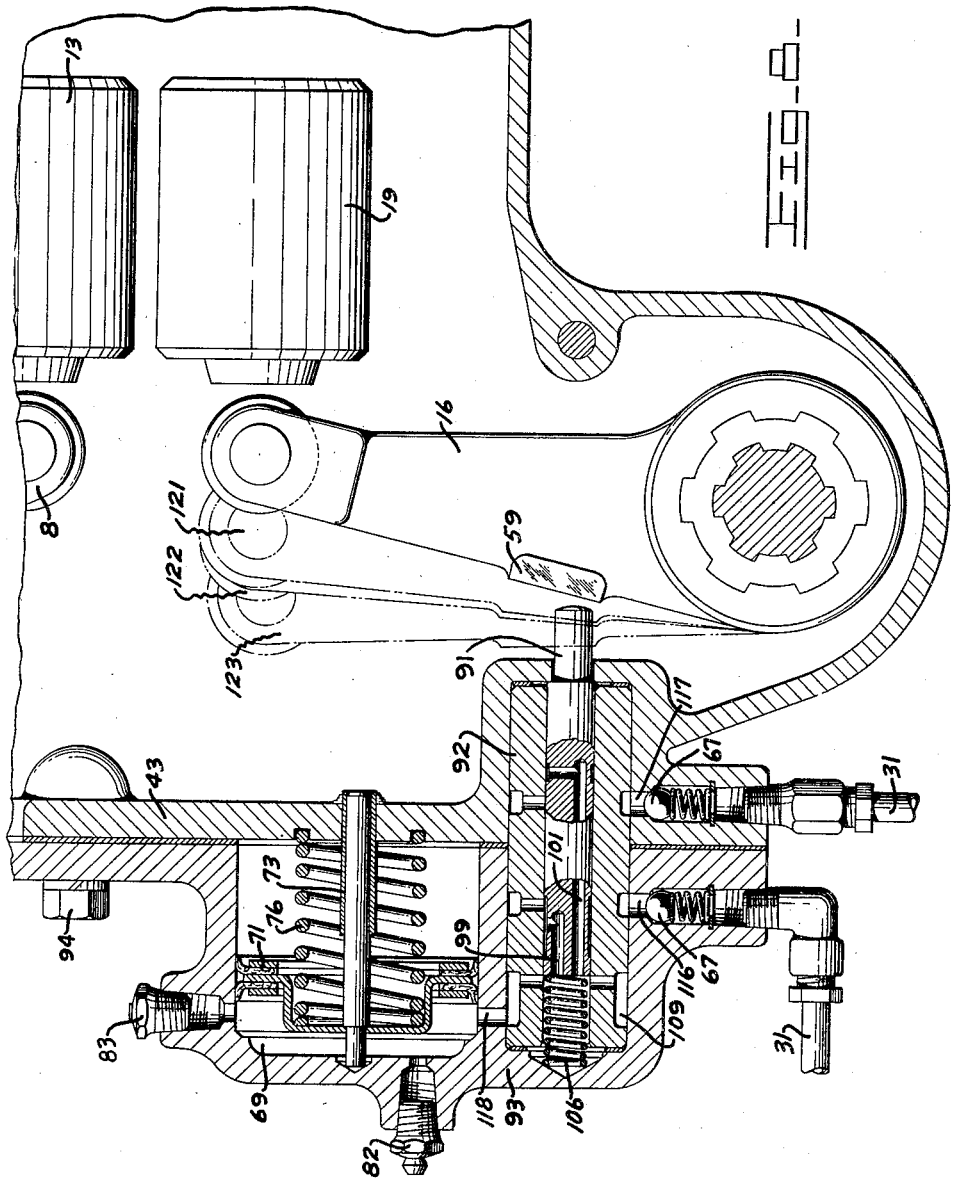

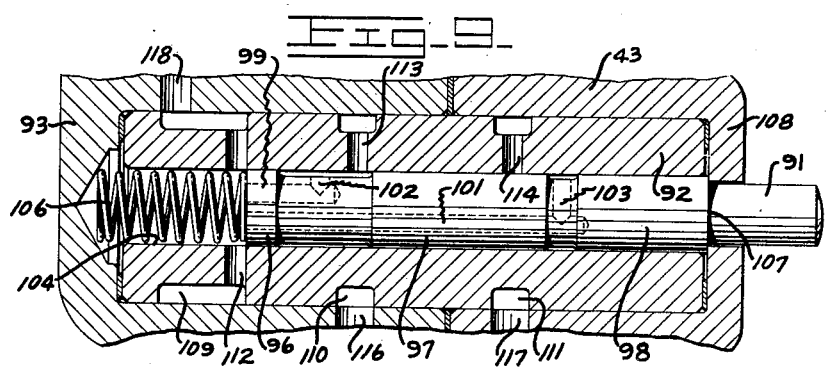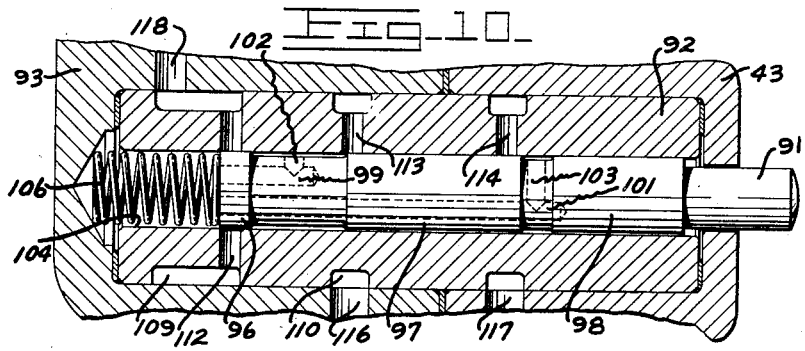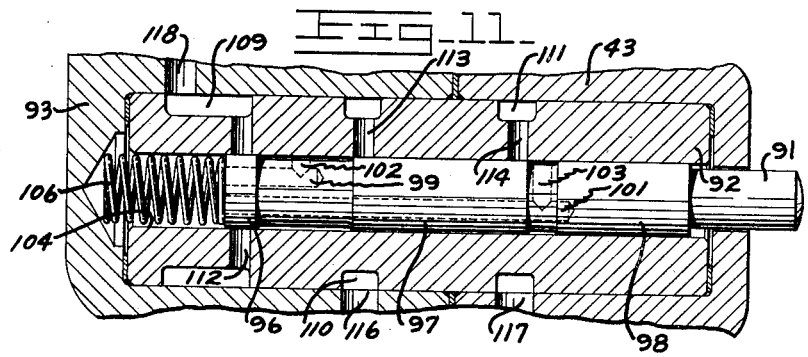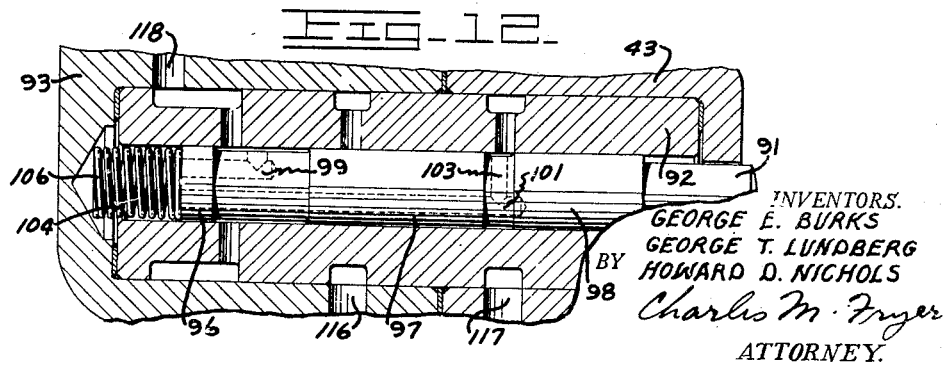

Patented Apr. 24, 1951

2,549,889

UNITED STATES PATENT OFFICE 2,549,889

LUBRICATING SYSTEM

George E. Burks, George T. Lundberg, and Howard D. Nichols, Peoria, Ill., assignors to Caterpillar Tractor Co., San Leandro, Calif., a corporation of California Application August 16, 1946, Serial No. 690,842

1 Claim. (Cl. 184—6)

The present invention relates to lubricating systems and more particularly to a system for automatically supplying a measured quantity of lubricant to lubricated operating parts each time the parts are operated.

The lubricating system of the present invention will have many applications but is especially useful for, and will be herein described and illustrated in connection with its adaptation to a track type tractor, and particularly to the lubrication of the steering clutch release bearings of such a tractor.

The steering of a track type tractor is accomplished by clutches which are disposed between the power transmission unit and the tracks. A separate clutch is provided for each track and in operation disengagement of one of these clutches interrupts the driving parts to its associated track so that the opposite track, working alone, causes the tractor to turn in the direction of the idle track. These two clutches are used frequently in the normal operation of a tractor with the result that clutch release bearings employed with them are in need of frequent lubrication. Ordinary methods of lubricating the clutch release bearings of the tractor have proven inadequate. A large supply of lubricant to them usually results in waste because the bearings become overheated due to their proximity to friction type clutches and the viscosity of the lubricant is reduced to a point where it becomes ineffective or drains off. Frequent manual application of lubricant is impractical because tractors are desirably operated for long periods of time and because failure to lubricate may result in destruction of the bearings.

It is an object of the present invention to provide a lubricating system for use on clutch release bearings or other intermittently operated parts wherein a measured quantity of lubricant is directed to the lubricated part automatically each time the part is actuated or placed in operation. Further and more specific objects and advantages of the invention are made apparent in the following specification wherein reference is made to the accompanying drawings.

In the drawings:

Figs. 4, 5 and 6 are enlarged sectional views of one of the plunger mechanisms illustrated in Fig. 3 showing the parts of the mechanism in different positions during its cycle of operation;

Fig. 7 is an enlarged sectional view taken on the line VII—VII of Fig. 1;

Fig. 8 is a horizontal section similar to Fig. 3 but illustrating a modified form of the invention;

Figs. 9, 10, 11 and 12 are enlarged sectional views of the plunger mechanism illustrated in Fig. 8 showing the parts thereof in different phase positions.

Figure 1:
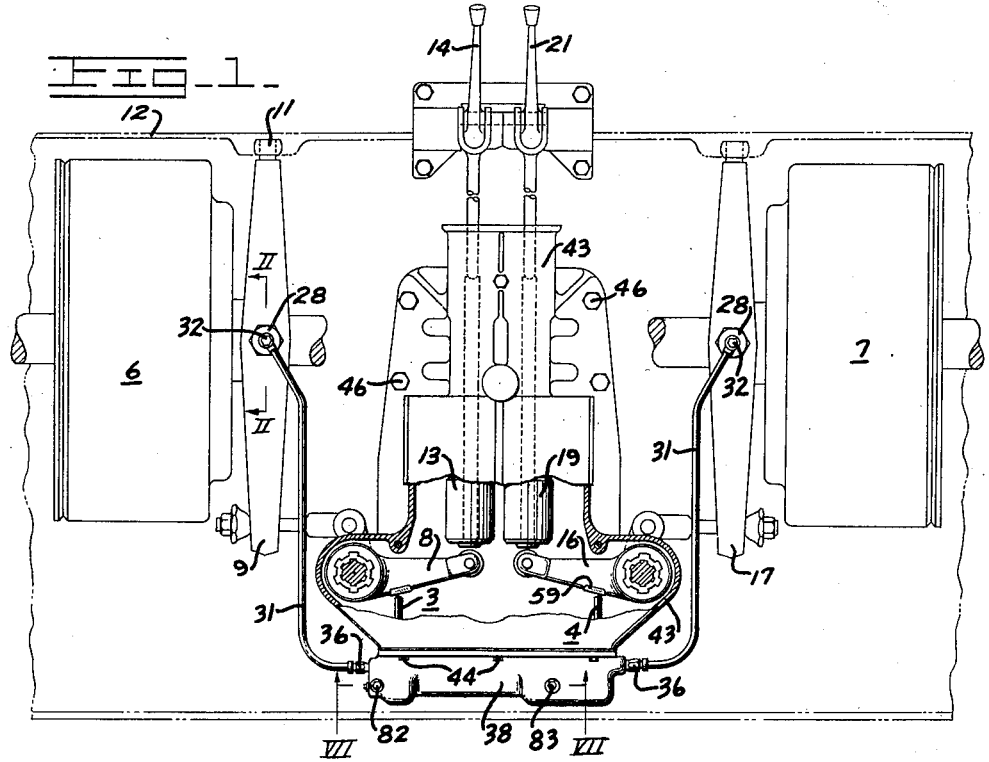
Fig. 1 is a plan view of a lubricating system embodying the present invention with parts shown in section and illustrating the application thereof to the clutch release bearings of a track type tractor, portions of which are illustrated.

Referring first to Fig. 1 of the drawings, the lubricating system of the present invention is illustrated as comprising a pair of plungers 3 and 4 which are positioned for operation by parts of the control linkage which actuates a pair of tractor steering clutches indicated at 6 and 7. The plunger 3 is positioned for operation by a lever arm 8 which is connected through suitable linkage to one end of a fork 9. The opposite end of the fork 9 is pivoted, as at 11, to a stationary part or wall 12 of a housing within which the steering clutches 6 and 7 are disposed. The lever arm 8 is actuated manually or through a conventional hydraulic piston 13, which is controlled in a well known manner by manipulation of a control lever 14. The plunger 4 is disposed for operation by a lever arm 16 which is associated with the clutch 7 through a yoke 17 pivoted to the housing 12 as at 18 in the same manner as the yoke 9. A hydraulic piston 19 corresponding to the piston 13 is controlled by means of a hand lever 21.

Each of the yokes 9 and 17 is operatively connected with a release bearing for the clutches 6 and 7, respectively. The nature of this connection is shown in enlarged detail in Fig. 2 wherein one of a pair of pins 28 is illustrated as carried by the yoke member 9 and as having a trunnion 27 extending into a boss 26 in a cage 24 which carries the release bearing shown at 23. The bosses 26 are diametrically opposed on the release bearing cage 23 and are both engaged by trunnions 27 in the manner shown.

Figure 2:
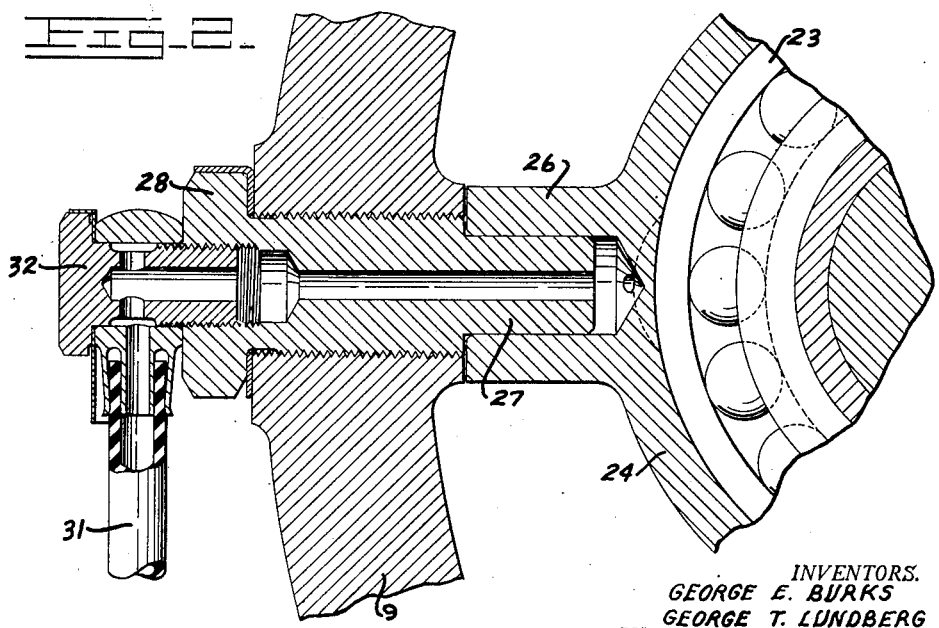
Fig. 2 is an enlarged fragmentary sectional view taken on the line II—II of Fig. 1.

A lubricant conduit 31 (see Figs. 1 and 2) is connected to one of the pins 28 in each yoke by means of a fitting 32. The fittings 32 and pins 28 are provided with suitable passages as shown in Fig. 2 for the communication of lubricant from the conduit 31 to the clutch release bearing 23. The conduits 31 are connected as by fittings 36 to a housing 38 (Figs. 1 and 3) in which the plungers 3 and 4 are disposed. The housing 38 is bored for the reception of cylinder sleeves 39 and 41 which contain the plungers 3 and 4, respectively. Snap rings 42 received in suitable grooves in the cylinder sleeves are held between the housing 38 and an adjacent housing part 43, which is secured thereto as by cap screws 44, for retaining the cylinder sleeves in place. Cap screws 46 (Fig. 1) are shown as means for securing the housing part 43 to the main housing 12.

Figure 3:
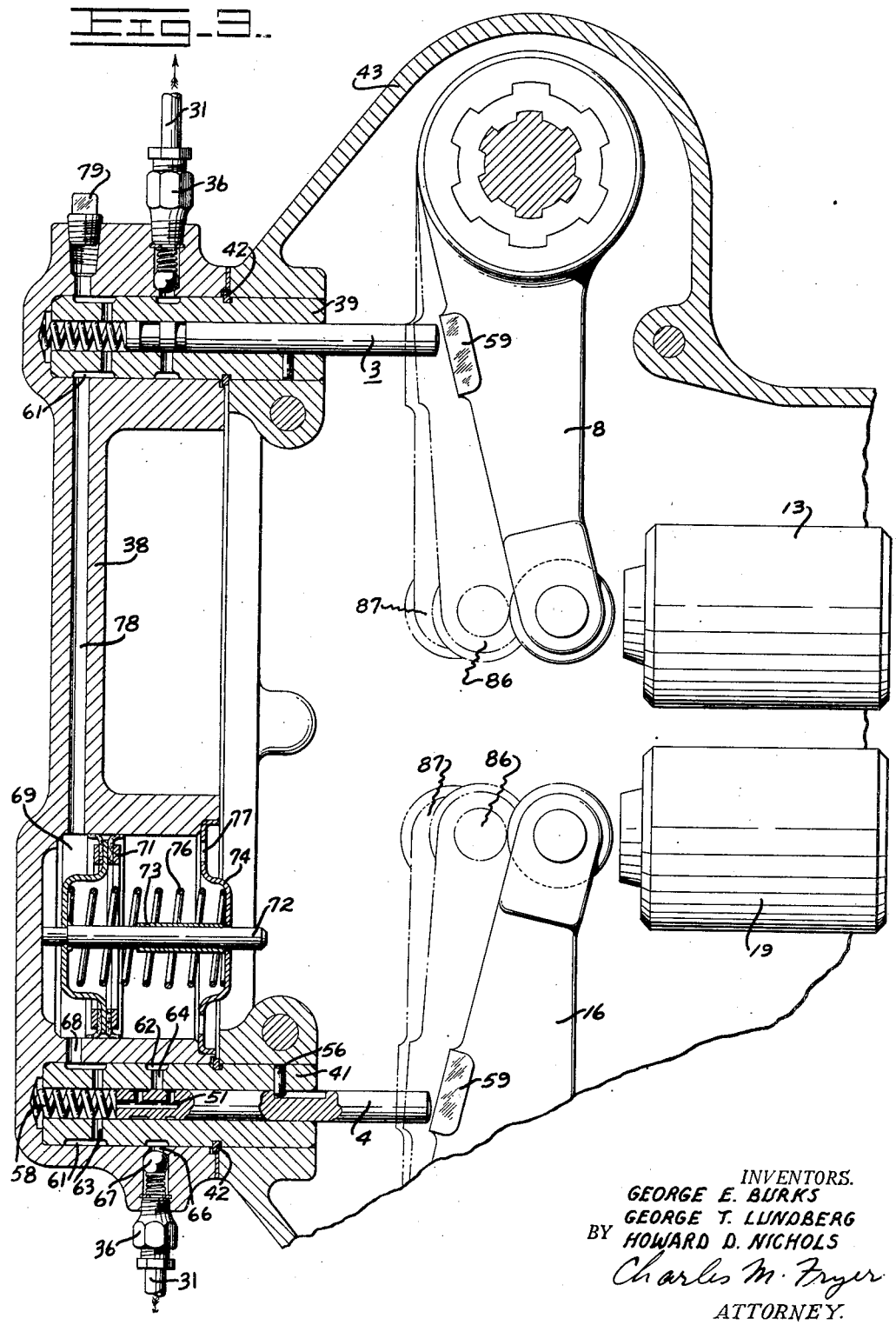
Fig. 3 is an enlarged horizontal sectional view of the principal portions of the lubricating mechanism illustrated in Fig. 1.

As the plungers 3 and 4 and the cylinder sleeves 39 and 41 in which they reciprocate are substantially identical in construction, the following detailed description of the plunger 4 illustrated in Figs. 3 to 6, inclusive, will suffice for an understanding of the operation of both. In these figures the plunger 4 is shown as provided with circumscribing grooves which provide spaced lands 47, 48 and 49. An axial passage 51 communicates with radial passages 52 and 53. The passage 52 opens into the groove between the lands 47 and 48 and the passage 53 terminates between the lands 48 and 49. A pin 56 carried by the cylinder sleeve 41 projects into a slot 57 which extends longitudinally of the plunger as a means to limit the reciprocal movement of the plunger in the sleeve. A spring 58 engages the pressure end of the plunger normally to urge it toward its retracted position in which its outer end is disposed adjacent a pad 59 carried by the lever arm 8 or 16 of the clutch control linkage. The cylinder sleeve 41 is provided with spaced circumscribing recesses 61 and 62 and with radial passages 63 and 64 which communicate between these recesses respectively and the inner bore 54 of the cylinder sleeve. A check valve may, if desired, be associated with the recess 62 through an opening 66 in the housing 38 which, as shown in Fig. 3, receives the check valve 67 disposed in a position for cooperation with the lubricant conduit 31 where it is connected by the fitting 36 to the housing.

A passage 68 in the housing communicates between the groove 61 of the cylinder sleeve and the interior of a lubricant reservoir shown at 69 in Fig. 3. The lubricant reservoir 69 has a cylindrically shaped interior and contains a piston 71 secured to a rod 72 which is reciprocally carried by a sleeve 73 secured to and carried by a plate 74 which closes one end of the reservoir. Spring 76 interposed between the plate 74 and the piston 71 normally urges the piston inwardly of the cylindrically shaped reservoir and the closure plate 74 is suitably vented as indicated at 77. A supply of lubricant may be introduced to the reservoir 69 by way of a passage 78 communicating with the recess 61 of sleeve 39, see Fig. 3, and with an opening in the housing which is normally closed as by a plug 79. For convenience in introducing lubricant to the passage 78, a passage 81 communicating therewith as shown in Fig. 7 is provided with a standard lubricant supply fitting 82. As lubricant is introduced through the fitting 82, passage 81 and passage 78 into the supply reservoir 69, the piston 71 therein is forced against the action of the spring 76 toward the plate 74. The quantity of lubricant contained by the reservoir is limited by contact of the piston 71 with sleeve 73. A pressure relief valve 83 illustrated in Fig. 7 may be employed in conjunction with the lubricant reservoir to permit the escape of excessive lubricant introduced thereto. When the reservoir is filled to capacity, the lubricant therein is under pressure which results from the action of the spring loaded piston.

In the operation of a tractor steering is accomplished by manipulation of the levers 14 and 21 to effect release of the clutches 6 and 7, respectively, depending upon the direction in which it is desired to steer the tractor. Each time one of the levers 14 or 21 is operated the hydraulic mechanisms 13 and 19, respectively, are actuated to swing one of the lever arms 8 or 16 to effect depression of the plungers 3 or 4 as the pad 59 on the lever arm engages the plunger end. Referring to Fig. 3, movement of the lever arm 8 or 16 to the dotted line position 86 will effect depression of its corresponding plunger to move the same from the position illustrated in Fig. 4 to the position illustrated in Fig. 5. In the latter position, the land 47 of the plunger has just closed the radially disposed passage 63 in the cylinder sleeve 41 and at this time the inner bore 54 of the sleeve, the axial passage 51 in the plunger connecting radial passages 52 and 53 are all filled with lubricant which was admitted under pressure from the reservoir 69 prior to the closing of the passage 63. As the lever arm continues its swinging movement to the position shown in 87 in Fig. 3 the plunger continues its inward movement to the position illustrated in Fig. 6 where the inner bore 54 of the cylinder is again in communication with the passage 63 by way of the bore 51 and passage 52. By further reference to Figs. 5 and 6, it may be seen that the passage 64 is about to be closed by the land 49 just as the passage 63 is about to be opened by movement of the land 47. Therefore, upon inward movement of the plunger 4 or movement to the left as illustrated in Fig. 5, lubricant is forced through the passages 51 and 53 in the plunger and into the passage 66 by means of which it is transmitted to the bearing to be lubricated. Delivery of lubricant to the bearing in this manner continues only for the short period of time between closing of the passage 63 and final closing of the passage 64. Upon continued movement of the plunger to the position shown in Fig. 6, the passage 64 is closed to prevent further delivery of lubricant to the bearing and the passage 63 is reopened so that lubricant under pressure in the cylinder sleeve is bypassed back toward the reservoir through the plunger passages 51 and 52.

In further explanation of the foregoing description of operation, Fig. 5 illustrates the spacing of the relieved portions and lands on the plunger 4 relative to the passage ways in the pump barrel as being such that the land 47 just closes the passage 63 before the main part of the plunger 49 closes the passage 64 that leads to the outlet 66. Upon careful inspection of Fig. 5, it is seen that the passage 63 is closed just completely closing the bore 54 of the pump barrel. In this same position of the pump, the passage 64 has not quite been closed. The reason for the very small opening into the passage 64 is that a very small quantity of lubricant is required. The effect with a larger quantity of lubricant would be obtained by moving the right end shoulder of the groove between lands 48 and 49 toward the right.

The spring loaded check valve 67 which cooperates with the passage 66 prevents lubricant from flowing through the conduit 31 immediately upon opening of the passage 64 by a slight forward movement of the plunger and insures that a small measured quantity of lubricant under pressure will be directed toward the bearing only in the event of a substantially complete inward stroke of the plunger. The presence of the check valve is, however, not essential to satisfactory operation under all conditions and in some cases it may preferably be omitted.

In the modified form of the invention illustrated in Figs. 8 to 12, inclusive, a single plunger is employed for directing lubricant simultaneously to both of the clutch release bearings. As many of the parts employed in this structure are identical with the parts heretofore described corresponding reference characters will be employed in their description. In Fig. 8 a single plunger 91 is shown as reciprocally disposed in a cylinder sleeve 92 which is carried by a housing part 93 secured as by cap screws 94 with the housing part 43. This plunger 91 is circumferentially grooved as illustrated in Figs. 9 to 12 to provide lands 96, 97 and 98. Two passages 99 and 101 are bored longitudinally of the plunger. The passage 99 intercepting a passage 102 which communicates with the space between lands 96 and 97 while the passage 101 intercepts a passage 103 communicating with the space between lands 97 and 98. The plunger reciprocates in a bore 104 of the cylinder sleeve and a spring 106 normally urges the plunger outwardly a distance limited by contact of a shoulder 107 with the housing wall 108.

The cylinder sleeve 92 is provided with circumscribing grooves 109, 110 and 111. A radial passage 112 in the cylinder sleeve connects its bore 104 with the recess 109, radial passage 113 connects the bore with recess 110 and radial passage 114 connects the bore with recess 111. A passage 116 in the housing communicates with the conduit 31 which leads to one of the clutch release bearings and a similar passage 117 connects with the other conduit 31 leading to the other bearing, a check valve 67 being employed in these passages if desired. The housing also has a passage 118 which communicates between the groove 109 in the cylinder sleeve and the interior of the reservoir 69 which is substantially identical in its construction and function with the reservoir shown in Fig. 3.

When the plunger 91 is in its outermost position as illustrated in Figs. 8 and 9, the bore of the cylinder sleeve is in direct communication with the passage 118 and the groove 109 and the lubricant also occupies the passages 99 and 101 and communicating passages 102 and 103, respectively. The lubricant is therefore also in communication through passage 113, groove 110 and passage 116 with the conduit 31 which leads to one of the bearings to be lubricated. Consequently, upon the initial forward movement of the plunger which is occasioned by swinging of the lever arm 16 to the position illustrated at 121 in Fig. 8, the plunger is moved to the position of Fig. 10 forcing lubricant through the passage 113 and into the connected conduit 31. Further forward movement of the plunger represented by the position of the arm 16 shown at 122 in Fig. 8 closes the passage 113 as shown in Fig. 11 and commences to open the passage 114 which, as shown in the same figure, is about to be cleared by the land 97 to establish communication of the lubricant under pressure through passage 101, 103, 114, groove 111 and passage 117 where it eventually enters the other of the conduits 31 for directing lubricant to the other bearing. As the lever arm 16 swings to its foremost position as illustrated at 123 in Fig. 8, the plunger has completed its stroke and assumes the position shown in Fig. 12. Thus, in the movement of the plunger from the position of Fig. 9 to that of Fig. 12 a measured quantity of lubricant is directed first to one bearing and then to the other.

In both modifications of the invention the actuation of a mechanical part of a device serves to inject a measured quantity of lubricant to bearings which operate in conjunction with said device. Consequently, the bearings are always adequately lubricated without waste. The quantity of lubricant directed to them is measured by their requirements in service. In the modification of the invention first described, each part is supplied by lubricant each time it is actuated while in the second form of the invention described both bearings are lubricated each time that one of the bearings is placed in operation.

We claim:

In combination with a vehicle having a pair of steering clutches each with a separate release bearing and separate clutch control levers associated therewith, a common reservoir for lubricant, a pair of pumps associated with said reservoir for withdrawing lubricant therefrom and directing it each to one of said release bearings, and means associated with the clutch control levers for actuating one of the pumps to direct lubricant to the corresponding release bearing when its control lever is actuated.

GEORGE E. BURKS.
GEORGE T. LUNDBERG.
HOWARD D. NICHOLS.

REFERENCES CITED

The following references are of record in the file of this patent:

UNITED STATES PATENTS

| Number | Name | Date |
| --- | --- | --- |
| 1,625,618 | Manzel | Apr. 19, 1927 |
| 1,797,547 | Class | Mar. 24, 1931 |
| 2,164,518 | Hart | July 4, 1939 |
| 2,209,938 | Schauer | July 30, 1940 |
| 2,259,871 | Baker | Oct. 21, 1941 |

FOREIGN PATENTS

| Number | Country | Date |
| --- | --- | --- |
| 450,025 | Great Britain | July 9, 1936 |